US006624781B1

(12) United States Patent
Collins (10) Patent No.: US 6,624,781 B1
(45) Date of Patent: Sep. 23, 2003

(54) APPARATUS AND METHOD FOR HOLOGRAPHIC DETECTION AND IMAGING OF A FOREIGN BODY IN A RELATIVELY UNIFORM MASS

(75) Inventor: Carolyn Collins, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 0 days.

(21) Appl. No.: 10/109,627

(22) Filed: Mar. 27, 2002

(51) Int. Cl.[7] ............................................... G01S 13/89
(52) U.S. Cl. ........................................ 342/22; 342/179
(58) Field of Search .................................. 342/22, 179

(56) References Cited

U.S. PATENT DOCUMENTS

| | | | |
|---|---|---|---|
| 5,455,590 A | * 10/1995 | Collins et al. | 342/179 |
| 5,557,283 A | * 9/1996 | Sheen et al. | 342/179 |
| 5,835,054 A | * 11/1998 | Warhus et al. | 342/22 |

OTHER PUBLICATIONS

Osumi et al., "Detection of buried plant," IEE Proceedings of Radar and Signal Processing, vol. 135, Aug. 1988, p. 330–342.*

Osumi et al., "Microwave holographic imaging of underground objects," IEEE Transactions on Antennas and Propagation, Vo 33, Feb. 1985, p. 152–159.*

Ueno et al., "Pulse–radar holography for underground object imaging," Antennas and Propagation Society International Symposium, May 1983, p. 651–654.*

Tricoles et al., "Improved resolution in microwave holographic images," IEEE Transactions on antennas and propagation, Vo 29, Mar. 1981, p. 320–326.*

Sheen, DM et al., "Three–Dimensional Millimeter–Wave Imaging for Concealed Weapon Detection", p. 1581–1592. 2001.

* cited by examiner

Primary Examiner—Ian J. Lobo
(74) Attorney, Agent, or Firm—Todd J. Harrington (57) ABSTRACT

The present invention is an apparatus and method for displaying a foreign body in a relatively uniform mass having similar electromagnetic impedance as the foreign body comprising of at least two ultra wide band holographic radar units adapted to generate, transmit and receive a plurality of 12–20 GHz frequency signals in a dual linear antenna with slant-angle illumination. The invention may be utilized to obtain qualitative and quantitative data regarding the composition of the object under investigation.

12 Claims, 7 Drawing Sheets

APPARATUS AND METHOD FOR HOLOGRAPHIC DETECTION AND IMAGING OF A FOREIGN BODY IN A RELATIVELY UNIFORM MASS

FIELD OF THE INVENTION

The present invention is an apparatus and method for ultra wide band (UWB) radar holographic detection and imaging. The present invention relates generally to the field of ground penetrating radar (GPR) with a unique illumination method for detecting and imaging non-uniform objects.

BACKGROUND OF THE INVENTION

Previously, it has been shown that metallic and non-metallic type objects concealed within or close to the surface of the earth can be detected by conventional metal detectors, and with conventional GPR radar searching apparatuses. The most widely practiced technology for detection of near surface metallic objects has been the conventional "metal detector" device.

The first major obstacle in fielding a reliable GPR radar system arises when attempting to detect foreign objects in a relatively uniform mass having a similar electromagnetic impedance (dielectric constant) as the foreign object. When a buried object has a similar dielectric constant to the surrounding soil, it is essentially hidden from a conventional GPR searching radar signal. For example, plastic mines are constructed with materials that are typically the same electromagnetic impedance (dielectric constant) as dry sand produce extremely small reflections back to the searching radar. The typical dielectric constant for dry sand is from 3 to 4. GPR experiments with simulated plastic mines (inert explosive) supplied by the U.S. Army (Fort Belvoir) indicate these small reflections are less than 0.5 db above the sand reflection. If the radar is to detect these small mines, the surface reflection and the mine's reflection must be separated.

A typical metal detector is essentially ineffective and useless in the detection of small non-uniform objects buried in a relative uniform mass having a similar electromagnetic impedance as the foreign object. Current GPR systems use low frequencies (~250 MHz to 1 GHz) and vertical illumination techniques and are ineffective in detecting and imaging small near surface plastic mines because (1) the low frequency GPR wave lengths are to long for accurately imaging the small mines and (2) the mine's small reflections are concealed in the strong surface reflection which is not deflected away from the receiver.

The second major obstacle for conventional GPR is the lower frequencies limit the imaging (object characterization) capability of the systems since resolution is proportional to wavelength (inversely proportional to frequency). The lower frequency in such systems inhibit their ability to generate high enough resolution "3-D" images in order to identify small objects such as anti-personnel (AP) mines even if they were able to detect them. To effectively image (accurately size) and characterize objects the radar wavelength must be smaller than the object. Typically, AP plastic mines are approximately 2 cm in diameter and conventional GPR radar wavelengths (~70 cm to 20 cm) are much greater than these dimensions. This relationship negates imaging them with any degree of resolution for identification purposes.

SUMMARY OF THE INVENTION

The present invention is an apparatus for displaying a foreign body in a relatively uniform mass having similar electromagnetic impedance as the foreign body comprising of at least two ultra wide band holographic radar units adapated to generate, transmit and receive a plurality of 12–20 GHz frequency signals in a dual linear antenna with slant-angle illumination. The radar units have at least one transmitting antenna adapted to transmit the 8–20 GHz frequency signals generated from the radar unit wherein the transmitting antenna defines an acute angle relative to the surface of the relatively uniform mass. Moreover, the radar units have at least one receiving antenna adapted to receive a plurality of reflected signals from the foreign body wherein the receiving antenna defines an acute angle relative to the surface of the relatively uniform mass.

The present invention further comprises of a radar unit having at least one holographic transceiver adapted to process the received signal wherein the transceiver comprises of a high voltage controlled oscillator and at least one lower frequency oscillator.

The radar units further having at least one first signal transporter for transporting the received signals from the receiving antenna and to the transceiver. The radar units further having at least one second signal transporter for transporting the processed signal from transceiver and to a imaging display unit. The radar units further having at least one imaging display unit adapted to display a plurality of the process signals.

A further aspect of the present invention determines the presence of the foreign body by identifying the presence of signal intensity peaks in the reflected signal. The depth of the foreign body is indicated by the difference in time of the appearance of the signal intensity peaks.

A typical embodiment of the present invention places the transmitting and receiving antennas at an acute angle of about 20 degrees to about 40 degrees with respect to the surface of the relatively uniform mass. A more preferred embodiment of the present invention places the transmitting and receiving antennas at an acute angle of about 30 degrees with respect to the surface of the relatively uniform mass.

A further aspect of the present invention is a method of detecting and imagining foreign objects in a relative uniform mass comprising the steps of generating a plurality of 12–20 GHz frequency wide band signals from at least two holographic radar units wherein said holographic radar unit comprises of at least one transmitting antenna and at least one receiving antenna: A typical method is transmitting at least one 12–20 GHz frequency wide band signal at a first acute angle relative to the surface of a relatively uniform mass, and receiving at least one reflected signal at a second acute angle relative to the surface of said relatively uniform mass. The received signal is transmitted by a first signal transporter from receiving antenna and to a holographic transceiver. The transported signal is processed with at least one holographic transceiver. A processed signal is transported by a second signal transporter from at least one transceiver and to at least one imaging display unit, where the processed signal is displayed.

Another aspect of this present invention is a method wherein a transmitting and receiving antennae are positioned typically at an acute angle of between about 20 degrees and up to about 40 degrees with respect to said relatively uniform mass surface.

The most preferred embodiment of the present method has the transmitting and receiving antennae angled about 30 degrees with respect to the relatively uniform mass surface.

DETAILED DESCRIPTION OF THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. It is to be understood that, while the instant invention is described in the environment of detecting buried nonmetallic mines, the invention is also useful in a number of other environments, for example, underground pipe location and buried waste characterization. A first embodiment invention is shown in great detail, although it will be apparent to those skilled in the art that some of the features which are not relevant to the invention may not be shown for the sake of clarity.

Figure 1:
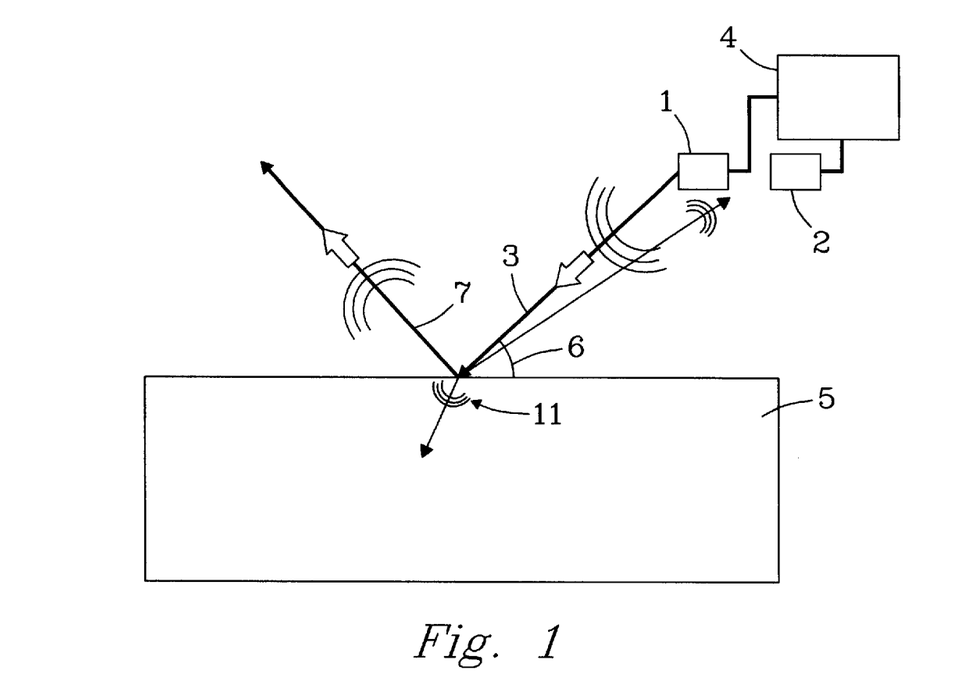
FIG. 1 is a holographic single array slant angle illumination without a buried mine in the sand.

A first embodiment of the present invention illustrates the condition without a buried mine in FIG. 1. The Holographic Radar 4 comprises at least one transmit array 1 and a Holographic Receive array 2 which are placed so the length of the arrays are parallel to the ground surface and the arrays are illuminating the region of interest at a slant angle 6 with the ground surface. The array slant angle 6 is typically 30-degrees from the normal to the ground surface. The transmit array 1 transmits a plurality of radar signals 3 toward the ground surface. In this orientation the radar transmit energy which impinges on the ground surface at an angle 6. The large surface reflection component 7 glances off into free space and is not part of the reflected signal. The transmit signal 11 that penetrates the ground surface 5 is absorbed in the ground substrate. Without a return signal separation capability (Slant Angle Illumination) it is not possible with current technology to field a reliable GPR radar system for the detection of nonmetallic buried objects.

Figure 2:
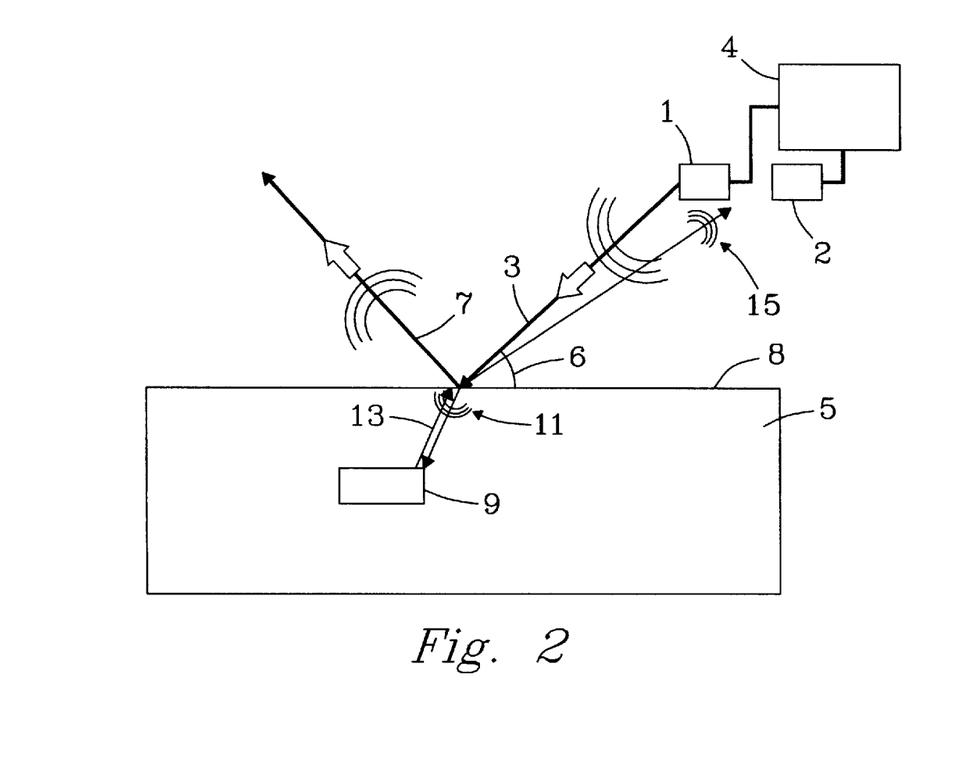
FIG. 2 is a holographic single array slant angle illumination with a buried mine in the sand.

FIG. 2 is a further embodiment of the present invention that shows this signal separation effect and illustrates what happens-when a buried plastic mine is present. A plastic mine 9 is located beneath the surface 8 of a predominately silica-type soil 5. The Holographic Transmit array 1 and the Holographic Receive array 2 are placed so the length of the arrays are parallel to the ground surface and the arrays are illuminating the region of interest at a slant angle 6 with the ground surface. The array slant angle 6 is typically 30-degrees from the normal to the ground surface. The transmit array 1 transmits a plurality of radar signals 3 toward the ground surface. In this orientation the radar transmit energy impinges on the ground surface at an angle. The large surface reflection component 7 glances off into free space and is not part of the reflected signal. A significant component of the transmit signal 11 enters the soil and propagates to the buried mine 3. The surface or edge of the mine 9 reflects a signal 13 that propagates back through the air 15 to the receive array 2. The orientation geometry of the array with the ground surface causes the small mine reflection signal 13 to reflect back to the receive array 2, while the large surface reflection 7 is directed away from the receiver array 2 effectively separating the two signals. Consequently, the small signal 13 from the object of interest is not overwhelmed by the strong surface return signal 15.

Figure 3A:
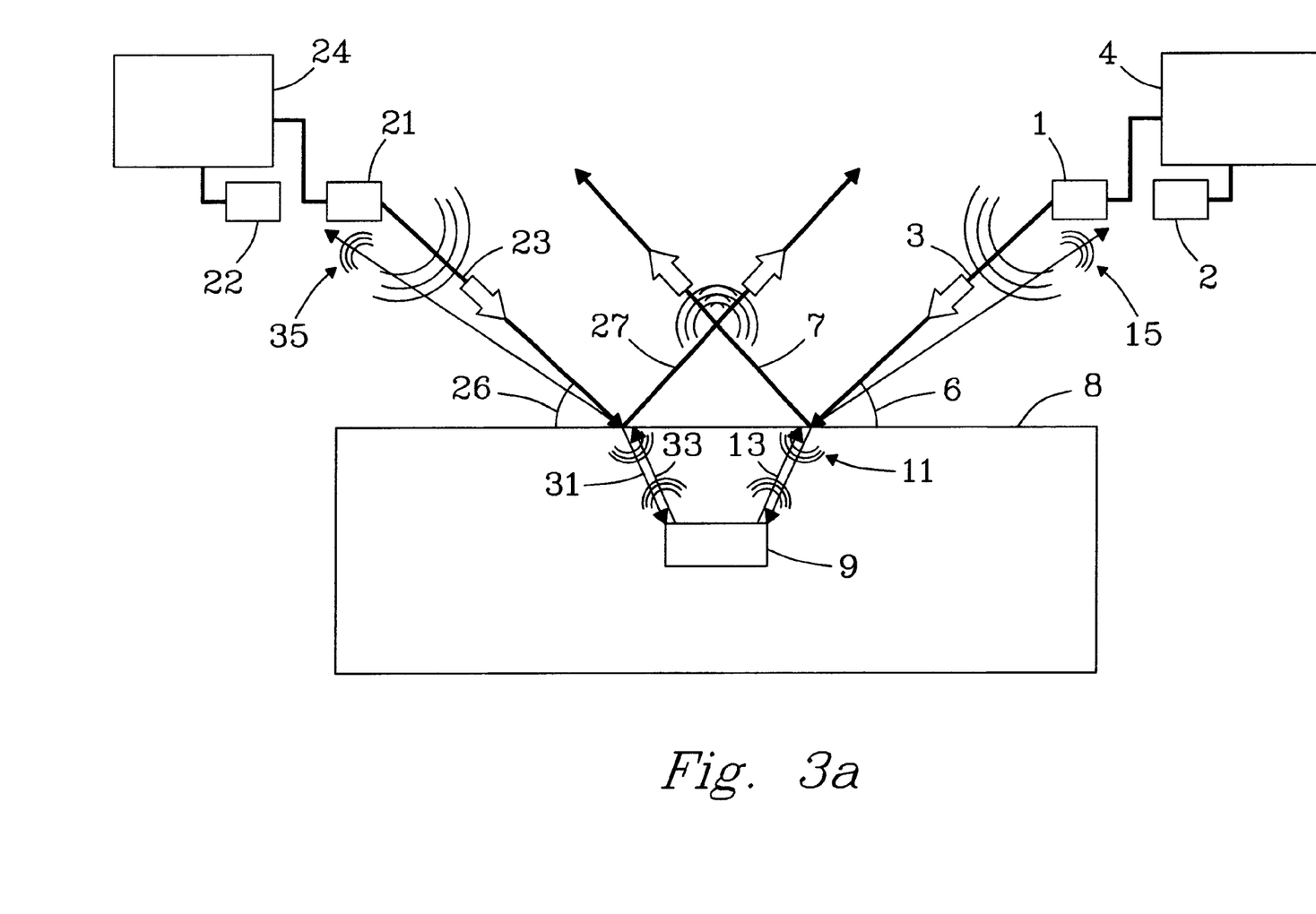
FIG. 3a is a holographic dual slant angle illumination.

FIG. 3a shows the geometry of a Holographic Dual Array Slant Angle system. Two arrays are utilized providing opposing illumination and more complete coverage is an improved method of detecting foreign objects in relative uniform mass the steps comprising transmitting a plurality of high frequency wide band signals from a slant-angle dual linear array configuration of holographic radar type underground searching apparatus. Holographic Radar 4 comprises of at least one holographic radar transmit array comprising a linear array of antennas, spaced evenly, with a length dependent on the aperture requirement of the application. Typically the antenna spacing is ⅔ the wavelength of the center frequency. The wavelength of 15 GHz in air is 2 cm, so typically the antenna spacing would be 1.3 cm. The array would be typically 50 cm in length. The holographic receive array 2 is identical to the transmit array and placed along side the transmit array by a separation of 2 cm. The holographic radar transmit and receive arrays 1 and 2 are connected to holographic radar 4 and the transmit and receive arrays 21 and 22 connected to holographic radar 24. The holographic radar's transmitting 1 and 21 and receiving 2 and 22 arrays have typically a 30 degree slant-angle with respect to average ground surface illumination. First transmitting array 1 transmits a plurality of high frequency (8–20 GHz) wide band signals to illuminate the earth surface at approximately 30 degree angle and reflects a signal away from the holographic radar 4 while holographic radar 24 is off. Holographic radar 4 receives a reflected signal at receive array 2 only when a buried mine is present (see FIG. 1 through FIG. 3a). Then holographic radar 24 is turned on and transmits a plurality of high frequency wide band signals from transmit array 21 at a typical 30 degree acute angle with respect to average ground surface. Holographic radar 24 receives a reflected signal at receive array 22 only when a buried mine is present (see FIG. 3a). The two opposing arrays illuminate the buried object from both sides and the composite high-resolution "3-D" image (top view) appears as two half-circles or crescents. The two crescents define the size of the mine in top view. Multiple 3-dimensional views of the buried object can be generated with these data, and will define its depth and orientation for accurate identification. A real time system will have the unique ability to generate 10 images per second in 3-dimensional view. This will significantly reduce the false alarm rate and provide the operator with a reliable detection and identification system for eliminating these devices.

The high frequency wide band signals (12–20 GHz) are then processed by the holographic radar transceiver, and then sent to a computer for "3-D" image reconstruction and TV display in real time. The computer reconstruction algorithm is described well in the paper "Three-Dimensional Millimeter-Wave Imaging for Concealed Weapon Detection", D M Sheen, et al., IEEE Transactions on Microwave Theory and Techniques, VOL. 49, No 9, September 2001.

Figure 3B:
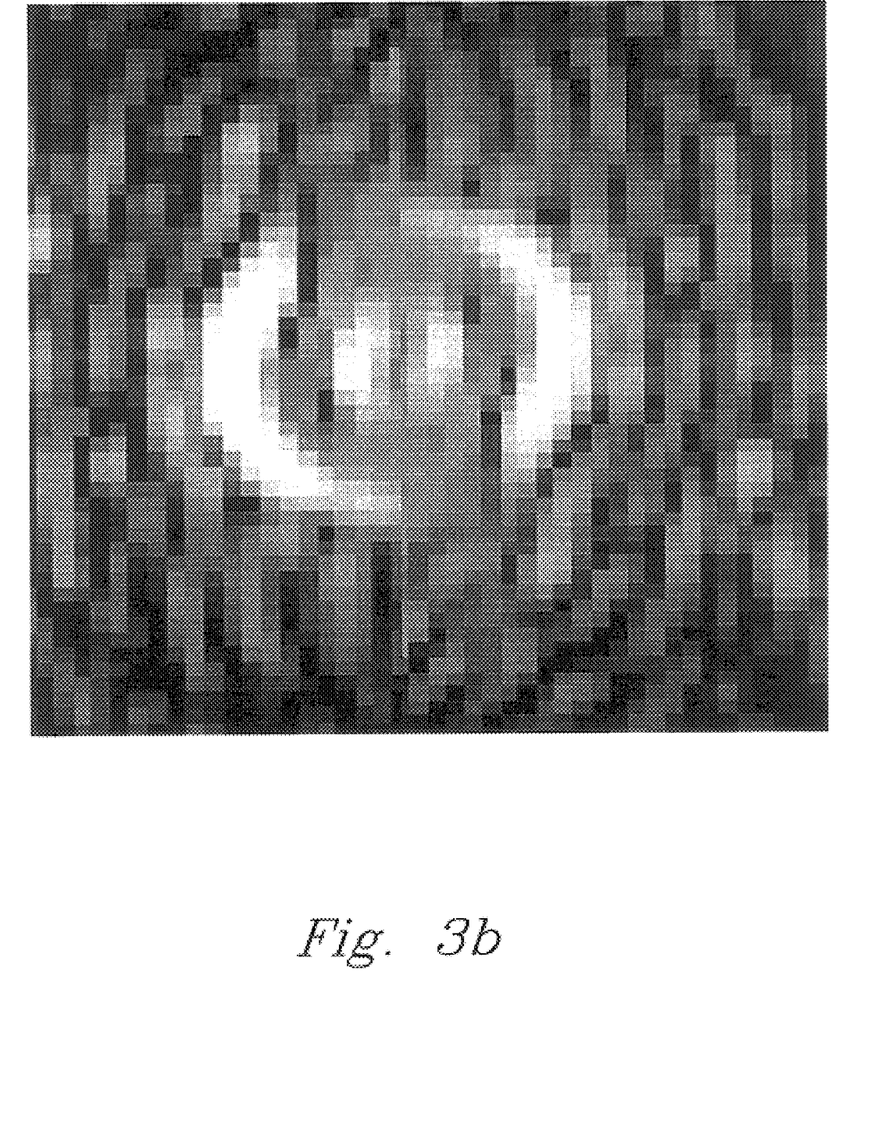
FIG. 3b is a computer generated holographic dual array slant angle illumination of a buried mine.

The images generated by the two separate array system are subsequently integrated for a composite image. FIG. 3b shows the extremely high resolution top view "3D" image of a near surface plastic mine illustrating the capability of the Holographic Dual Slant single array GPR system. One could imagine more arrays implemented and their results integrated for more complete coverage. The advantage of a dual array system is that it gives sufficient coverage and allows for the arrays themselves to be any practical length so that a large swath can be covered at one time. Each array system generates one-half of the circular mine image and then they are integrated into a single image as shown in FIG. 3b.

Figure 4:
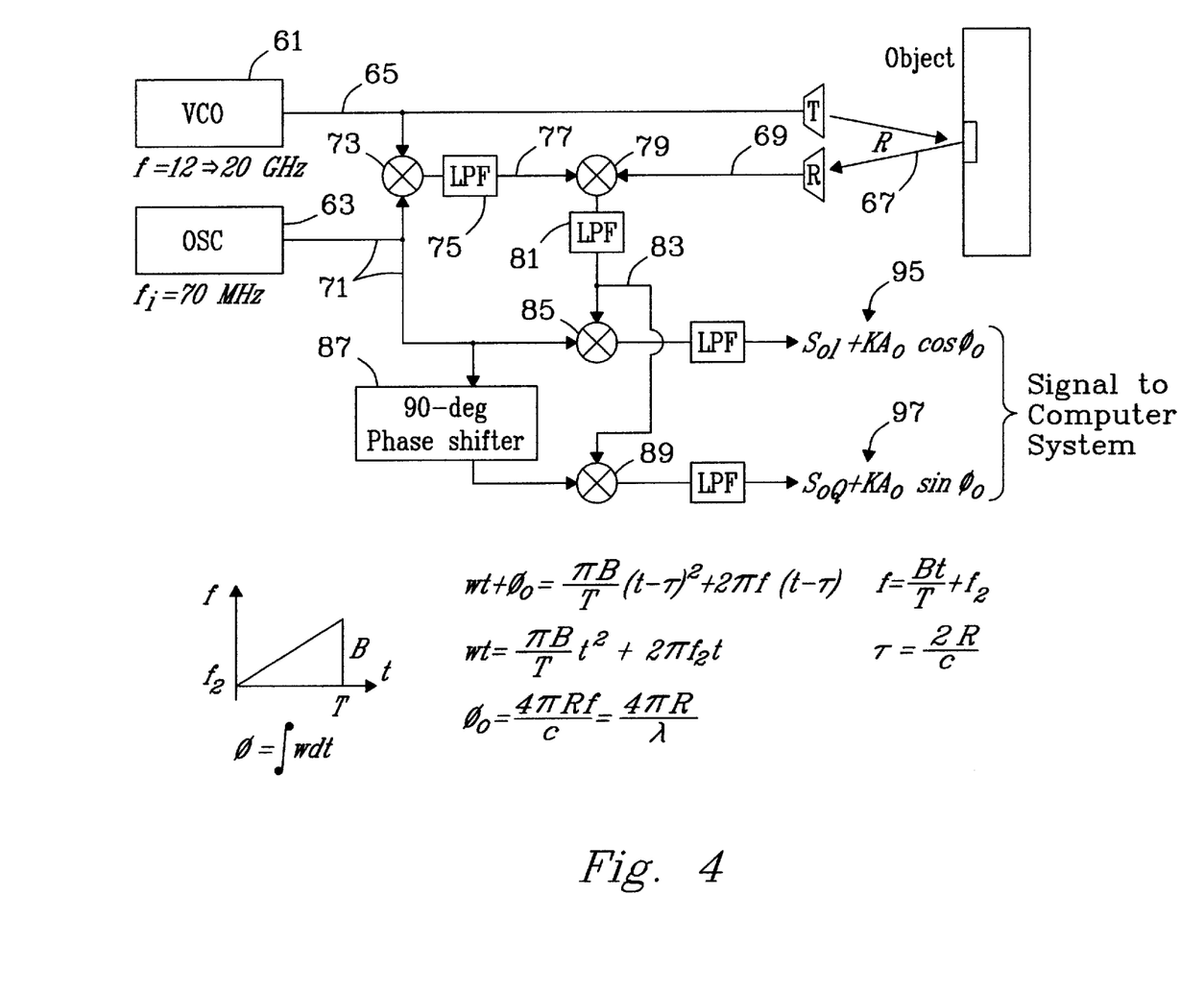
FIG. 4 is simplified block diagram of a wide band holographic radar.

FIG. 4 is a simplified block diagram of a typical wide band heterodyne radar transceiver that can be used in a dual array slant angle illumination GPR (12–20 GHz). In summary, the sweep frequency radar transceiver consists of a high frequency (12–20 GHz) voltage controlled oscillator (VCO) 61 and one lower frequency (70 MHz) oscillator (OSC) 63 used as the intermediate frequency. The common dual frequency heterodyne design simplifies the system by reducing the number of components required at the higher rf frequency. The resulting output signals, $S_{oI}$ and $S_{oQ}$, are then digitized by a computer for subsequent 3-dimensional image reconstruction and display. The imaging algorithm implemented is well described in the paper previously referenced in paragraph [0014].

Specifically, the VCO 61 output signal 65, $S_r$ ($A_r \cos wt$), is transmitted by the antenna, T, and propagates to the object through air and the ground material, reflects off the object, and propagates back the receive array antenna. The VCO 61 is rapidly swept from 12 to 20 GHz for each antenna pair in the slant array. The received signal is captured after a delay travel time of, $$\tau = \frac{2R}{c} 67,$$

where R is the distance to the object, and c is the velocity of wave propagation. The received signal 69 at the antenna, R, is $S_o$ ($A_o \cos(wt+\phi_o)$) and contains the object's reflectivity information in both phase ($\phi_o$) and amplitude ($A_o$). A reference signal 77 $S_{ri}=A_iA_r \cos(w-w_i)t$ is generated in the transceiver by multiplying the VCO output,f, with the intermediate frequency signal 71 $S_i$ ($A_i \cos w_i t$) using mixer 73. The result of this multiplication is ($A_iA_r \cos(w-w_i)t+A_iA_r \cos(w+w_i)t$) which has a low and high frequency component. A tuned low pass filter 75 is placed in the system at this point to retain only the low frequency component of this signal and the reference signal 77 $S_{ri}=A_iA_r \cos(w-w_i)t$ is generated. The signal processing continues with the reference signal 77 being multiplied with the received signal 69 using mixer 79. The result of this multiplication is $A_iA_rA_o \cos(2 wt+\phi_o-w_i t)+A_iA_rA_o \cos(\phi_o+w_i t)$ which has a high frequency component and a low frequency component. The low frequency component of the signal is retained by applying a low pass filter 81 to the signal at this point. The resulting object signal 83 ($S_{oi}=kA_o \cos(w_i t+\phi_o)$) is the object phase information modulated at the IF frequency,$f_i$. The object signal 83 is multiplied with the IF signal at mixer 85. The object signal 83 is also multiplied with a component of the IF signal that has been shifted in phase by a 90-degree phase shifter 87 $A_i \sin (w_i t)$. This component is multiplied with the object signal 83 at mixer 89. The results of these two multiplications are two signals in quadrature. The in-phase component is given by $$kA_o \cos(2w_i t+\phi_o)+kA_o \cos(\phi_o).$$

The quadrature component is given by $kA_o \sin(2w_i t+\phi_o)+ kA_o \sin(\phi_o)$. The final signals are generated by passing.through tuned low pass filters 91 and 93 to remove the high frequency components. These final processed holographic signals are the in-phase $S_{oI}=KA_o \cos \phi_o$ 95 and quadrature $S_{oQ}=KA_o \sin \phi_o$ 97 which contain the object's amplitude ($A_o$) and phase information ($\phi_o$). Note that the object's amplitude and phase of the original high frequency received signal $S_o=A_o \cos(wt+\phi_o)$ 69 are faithfully recorded in terms of the two low frequency signals. The object's phase and amplitude can then be calculated using the following equations:

$$\phi_o = \tan^{-1}\left[\frac{quadrature signal}{inphase signal}\right],$$

$$A = \frac{1}{K}\sqrt{S_{oI}^2 + S_{oQ}^2}.$$

The in-phase and quadrature signals are then digitized and processed in a computer using the holographic image algorithm referenced earlier in [0014] and the "3-D" image is subsequently displayed.

Figure 5:
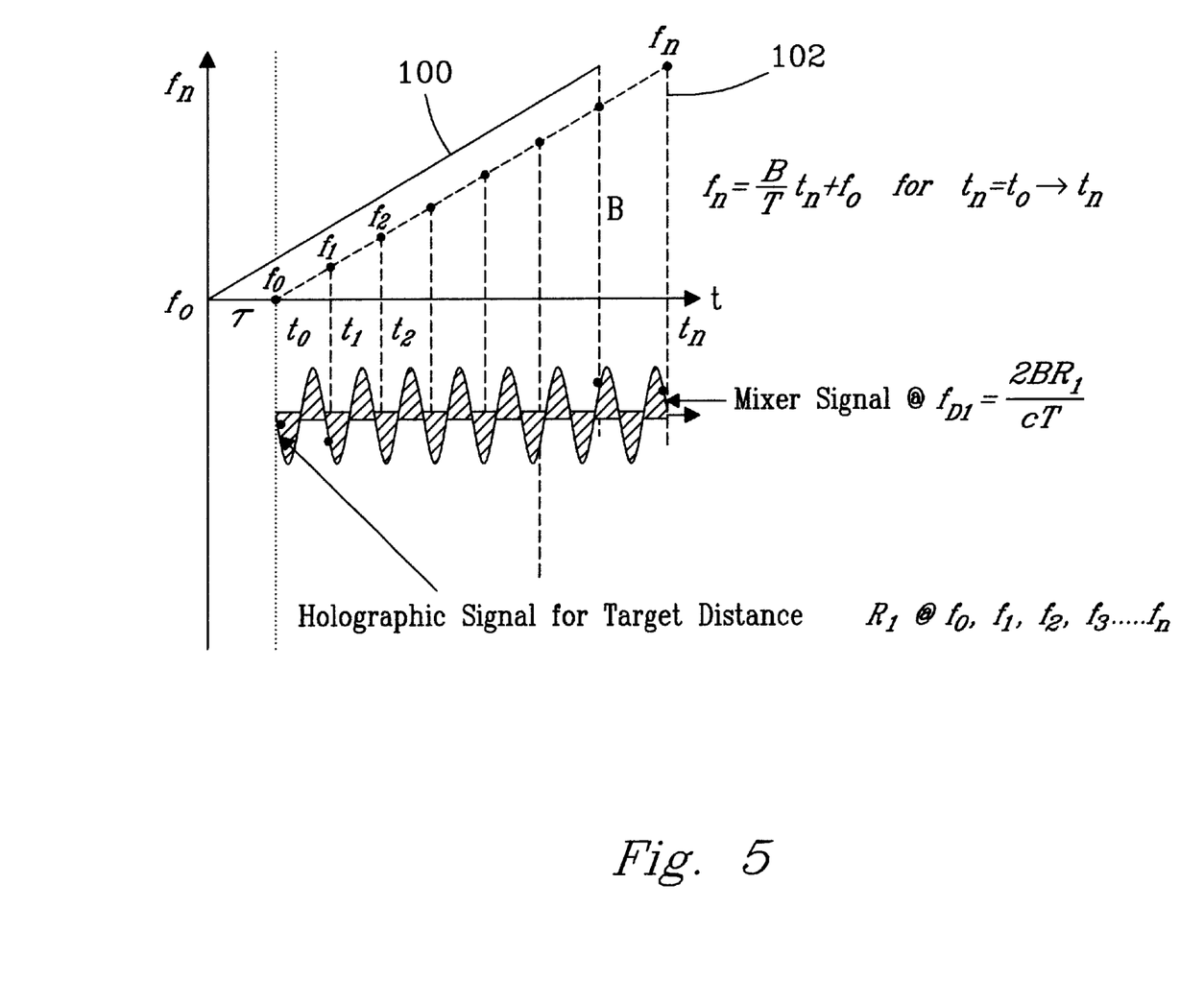
FIG. 5 is a graph illustrating wide band holographic signals for stationary point objects.

FIG. 5 is a diagram showing the sweep frequency signal processing for a single stationary point object. The transmit signal 100 is shown as a function of the sweep frequency and the receive signal 102 is delayed in time as a result of the object's distance. This delayed signal is then multiplied with the transmit reference signal. The low frequency component is retained with a low pass filter as described in the previous paragraph. The result is a difference frequency ($f_d$) signal for each object distance. The object's distance (R) varies as the antenna scans along the line and the mixer signal is a unique difference frequency for each distance given by the simple equation:

$$\left(f_d = \frac{2BR}{cT}\right),$$

where B=sweep frequency bandwidth, T=sweep time, c=speed of light, and R=target distance. The difference frequencies are linear function of object range and are usually in the kilohertz range for most radar applications.

The hologram signals are generated from sampling the received difference frequency signals (see FIG. 4) while the VCO is swept through the band of interest (in this case 12–20 GHz). In the simple example shown in FIG. 4 the transmit signal 100 is swept in frequency. Some time later the received signal 102 is detected from a simple single point object at a distance of $R_1$. This example shows the recorded signal for this scenario.

Figure 6:
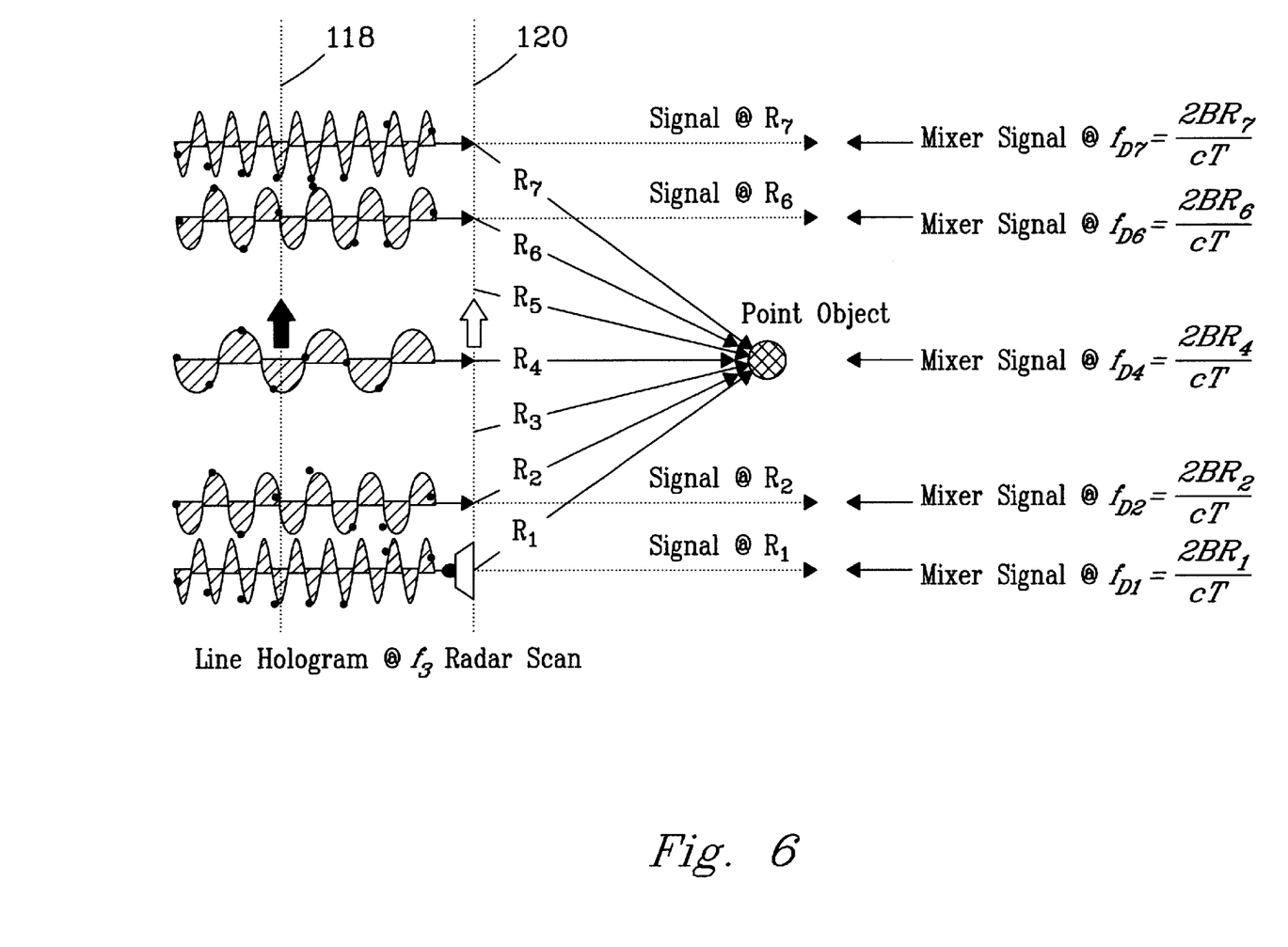
FIG. 6 is a graph illustrating point object holographic signals.
Figure 7:
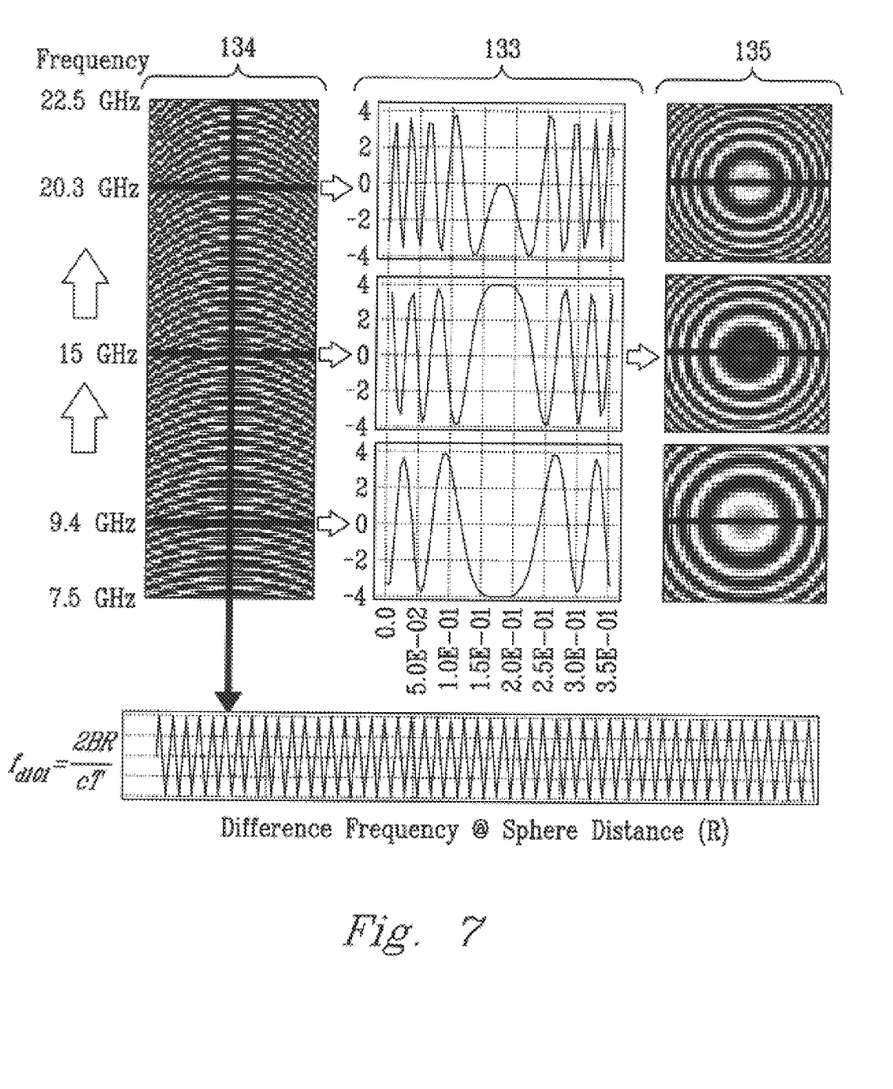
FIG. 7 is a figure illustrating sweep frequency holographic data.

If the antenna is mechanically translated across the object along a line 102 the resulting signals are represented on FIG. 5. Since the distance from the antenna to the point object varies as the antenna is translated, the recorded signal changes in amplitude and phase accordingly. In FIG. 6 the line 118 traces through the signals at a specific discrete rf frequency. FIG. 7 alternately shows this with actual data from a transceiver swept from 7.5 GHz to 22.5 GHz. The object is a single point reflector at a distance R from the antenna. The recorded waveform 131 is displayed pictorially on the left. Individual discrete frequency graphs 133 are shown in the center. Of particular interest are the actual single frequency holograms 135 shown on the right. These are representative data of discrete frequency plots of a 2-dimensional physical scan of the antenna system over a single point reflector.

The invention was tested using an ultra wide band holographic radar, 12 to 20 gigahertz mounted on an x-y scanner using simulated antipersonnel mines in dry sand. The high frequency ultra wide band holographic radar system is required to provide adequate 3-dimensional image resolution for identification of small objects. Lower frequency radar systems lack this ability as a result of their larger waver lengths, thus have a lower lateral image resolution. The novel slant-angle linear array configuration for detection and identification of buried objects significantly reduces the false alarm rate and provides the operator with a reliable detection and identification system for eliminating these devices from terra firma.

CLOSURE

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features herein before set forth and as follows in scope of the appended claim.

I claim:

1. An apparatus for displaying a foreign body in a relatively uniform mass having similar electromagnetic impedance as said foreign body comprising the steps of:
   a) At least two ultra wide band holographic radar units adapted to generate, transmit and receive a plurality of 12–20 GHz frequency signals in a dual linear antenna with slant-angle illumination;
   b) said radar units having at least one transmitting antenna adapted to transmit said 12–20 GHz frequency signals generated from said radar unit wherein said transmitting antenna propagating said 12–20 GHz signal defines a first acute angle relative to the surface of said relatively uniform mass;
   c) said radar units having at least one receiving antenna adapted to receive reflected signals reflecting off said foreign body wherein said receiving antenna defines a second acute angle relative to the surface of said relatively uniform mass;
   d) said radar units further having at least one holographic transceiver adapted to process said received signals wherein the transceiver comprises of a high frequency voltage controlled oscillator and at least one lower frequency oscillator;
   e) said radar units further having at least one first signal transporter for transporting said received signals from said receiving antenna and to said transceiver;
   f) said radar units further having at least one second signal transporter for transporting the processed signal from transceiver and to a imagining display unit;
   g) said radar units further having at least one imaging display unit adapted to display a plurality of said processed signals.

2. The apparatus as recited in claim 1, wherein the presence of said foreign body is identified by the presence of signal intensity peaks in said reflected signal.

3. The apparatus as recited in claim 1, wherein depth of said foreign body is indicated by the difference in time of the appearance of said signal intensity peaks.

4. The apparatus as recited in claim 1, wherein said transmitting antenna is positioned at an acute angle of between about 20 degrees to about 40 degrees with respect to ground surface.

5. The apparatus as recited in claim 1, wherein said transmitting antenna is positioned at an acute angle of about 30 degrees with respect to the surface of the relatively uniform mass.

6. The apparatus as recited in claim 1, wherein said receiving antenna is positioned at an acute angle of between about 20 degrees to about 40 degrees with respect to ground surface.

7. The apparatus in claim 1, wherein said receiving antenna is positioned at an angle of about 30 degrees with respect to ground surface.

8. A method of detecting and imaging foreign objects in a relative uniform mass comprising the steps of:
   a.) Generating a plurality of 12–20 GHz frequency wide band signals from at least two holographic radar units wherein said holographic radar units comprise at least one transmitting antenna and at least one receiving antenna;
   b.) Transmitting at least one 12–20 GHz frequency wide band signal at a first acute angle relative to the surface of a relatively uniform mass;
   c.) Receiving at least one reflected signal at a second acute angle relative to the surface of said relatively uniform mass;
   d.) Transmitting said received signal by a first signal transporter from receiving antenna to a holographic transceiver;
   e.) Processing the received signal with said at least one holographic transceiver;
   f.) Transporting the processed signal by a second signal transporter from said at least one transceiver to at least one imaging display unit;
   g.) Displaying said processed signal.

9. A method as recited in claim 8, wherein a transmitting antenna is positioned at an acute angle of between about 20 degrees and up to about 40 degrees with respect to said relatively uniform mass surface.

10. A method as recited in claim 8, wherein a transmitting antenna is angled about 30 degrees with respect to the relatively uniform mass surface.

11. A method as recite in claim 8, wherein a receiving antenna is angled between about 20 degrees and up to about 40 degrees with respect to said relatively uniform mass surface.

12. A method as recited in claim 8, wherein a receiving antenna is angled about 30 degrees with respect to the relatively uniform mass surface.

* * * * *

UNITED STATES PATENT AND TRADEMARK OFFICE
Certificate

Patent No. 6,624,781 B1                                Patented: September 23, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Heber Dale Collins (deceased), Richland, WA.

Signed and Sealed this Fourteenth Day of February 2006.

THOMAS H. TARCZA
*Supervisory Patent Examiner*
Art Unit 3662

UNITED STATES PATENT AND TRADEMARK OFFICE
CERTIFICATE OF CORRECTION

PATENT NO. : 6,624,781 B1
APPLICATION NO. : 10/109627
DATED : June 8, 2005
INVENTOR(S) : Heber Dale Collins, Deceased It is certified that error appears in the above-identified patent and that said Letters Patent is hereby corrected as shown below:

On the title pae: Item (75) Inventor: please replace "Carolyn Collins" with --Heber Dale Collins, Deceased--.

Signed and Sealed this

Seventh Day of November, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,624,781 B1 | |
| APPLICATION NO. | : 10/109627 | |
| DATED | : September 23, 2003 | |
| INVENTOR(S) | : Heber Dale Collins, Deceased | |

It is certified that error appears in the above-identified patent and that said Letters Patent is hereby corrected as shown below:

On the title pae: Item (75) Inventor: please replace "Carolyn Collins" with --Heber Dale Collins, Deceased--.

This certificate supersedes Certificate of Correction issued November 7, 2006.

Signed and Sealed this

Twelfth Day of December, 2006

JON W. DUDAS
*Director of the United States Patent and Trademark Office*